UNITED STATES PATENT OFFICE.

FELIX R. LANIER, OF MEMPHIS, TENNESSEE.

PROCESS OF PRESERVING COTTON SEED AND MEAL.

SPECIFICATION forming part of Letters Patent No. 248,762, dated October 25, 1881.

Application filed August 1, 1881. (No specimens.)

*To all whom it may concern:*

Be it known that I, FELIX R. LANIER, a citizen of the United States, residing at Memphis, in the county of Shelby and State of Tennessee, have invented certain new and useful Improvements in Process for Preserving Cotton-Seed Kernels and its Products; and I do hereby declare the following to be a full, clear, and exact description of the invention, such as will enable others skilled in the art to which it appertains to make and use the same.

This invention has relation to certain improvements in preserving cotton-seed kernels and its products for transportation or shipment and for other purposes; and the novelty consists in the process of preparing and packing the same, as will be hereinafter more fully set forth, and particularly pointed out in the claim.

In carrying out my invention I first pass the kernels through a hulling-machine to remove the hull or envelope, then separate the kernels from the hulls by means of any of the ordinary screening devices. The decorticated kernels are then passed through a crusher, which reduces them to a more or less granulated state, their condition depending, of course, on the adjustment of the rollers of the crusher, for the product may be delivered in the form of meal, or coarser, if desired; but it is not intended at this stage of the process to remove any of the oil contained in the kernels. As received from the crusher the product is a pulpy mass (more or less fine, as desired) consisting of the solid meat or gluten and oil. This mass I pack by any suitable press or packing device in casks, barrels, or boxes. In practice I press it in sufficiently compact to fill the package and cause the oil to cover the surface without, however, removing or pressing out any of the oil, the object being to pack and transport a given quantity of the mass in its own oil, thereby preserving the whole for an unlimited length of time. After the packages have arrived at their destination the mass is removed and put in powerful presses, which separate the oil from the meat or residue, the oil being used for commercial purposes and the meat as a stock food and as a fertilizer.

In the Patent No. 241,030, granted to me, I have placed the unbroken kernels in barrels without packing and filled the interstices with cotton-seed oil. The barrels were then headed up, and in that condition transported. In that patent a larger amount of oil than is necessary is used to preserve the kernels, while in the present invention, as hereinbefore set forth, I crush the kernels, and the oil therein contained I have found to be sufficient to preserve the meat, and by dispensing with the surplus oil a much greater amount of the crushed mass can be contained in a given package, and thus the article much more economically transported.

I am aware that corn-meal has been compressed in packages, and I do not claim that process.

Having thus fully described my invention and the manner of carrying out the same, what I claim as new and useful, and desire to secure by Letters Patent of the United States, is—

The process of preserving cotton-seed kernels, which consists in crushing the decorticated kernels without extracting the oil, and packing the mass in suitable receptacles with sufficient pressure to cause the oil to cover the surface, substantially as set forth.

In testimony whereof I affix my signature in presence of two witnesses.

FELIX R. LANIER.

Witnesses:
E. H. BRADFORD,
WILL. A. CRAIG.